United States Patent
Vallee

(10) Patent No.: US 7,063,359 B2
(45) Date of Patent: Jun. 20, 2006

(54) QUICK COUPLING DEVICE

(75) Inventor: Christophe Vallee, Orgeres (FR)

(73) Assignee: Legris SA, Rennes (FR)

( * ) Notice: Subject to any disclaimer, the term of this patent is extended or adjusted under 35 U.S.C. 154(b) by 118 days.

(21) Appl. No.: 10/488,354

(22) PCT Filed: Sep. 18, 2002

(86) PCT No.: PCT/FR02/03187

§ 371 (c)(1),
(2), (4) Date: Mar. 1, 2004

(87) PCT Pub. No.: WO03/027562

PCT Pub. Date: Apr. 3, 2003

(65) Prior Publication Data

US 2004/0245766 A1    Dec. 9, 2004

(30) Foreign Application Priority Data

Sep. 21, 2001 (FR) .................................. 01 12202

(51) Int. Cl.
*F16L 37/00* (2006.01)
(52) U.S. Cl. .................... 285/319; 285/3; 285/308
(58) Field of Classification Search .............. 285/3, 285/322, 308, 319
See application file for complete search history.

(56) References Cited

U.S. PATENT DOCUMENTS

| 5,468,028 | A | * | 11/1995 | Olson ........................ 285/322 |
| 5,474,336 | A | * | 12/1995 | Hoff et al. .................. 285/322 |
| 5,505,501 | A | * | 4/1996 | Seabra ....................... 285/322 |
| 5,673,945 | A |  | 10/1997 | Olson |
| 5,911,443 | A |  | 6/1999 | Le Quere |
| 6,224,117 | B1 | * | 5/2001 | Olson et al. ............... 285/322 |
| 6,869,109 | B1 | * | 3/2005 | Matsushita ................ 285/308 |

FOREIGN PATENT DOCUMENTS

| DE | 198 00 050 | 7/1998 |
| EP | 1 067 324 | 1/2001 |

* cited by examiner

*Primary Examiner*—David Bochna
(74) *Attorney, Agent, or Firm*—Young & Thompson

(57) ABSTRACT

The invention concerns a quick coupling device comprising a tubular insert (4) provided with external anchoring means (5), a prong washer (12) which delimits a passage and housed in the tubular insert, and at least a gasket (10), the device comprising a tubular bushing (9) connected by linking means (8, 12) to the tubular insert (4) to extend into the passage opening of the washer coaxially thereto.

8 Claims, 3 Drawing Sheets

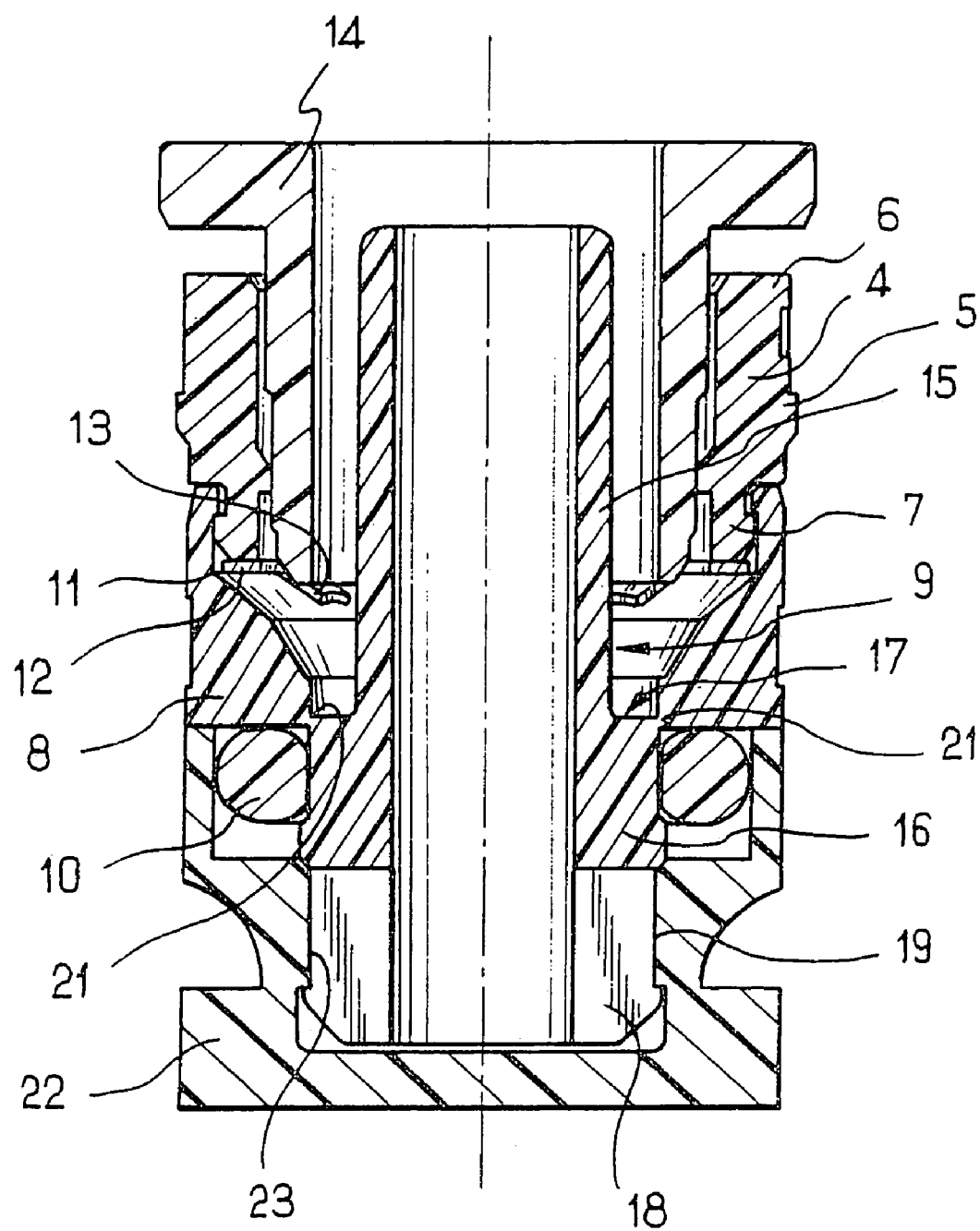
FIG_1

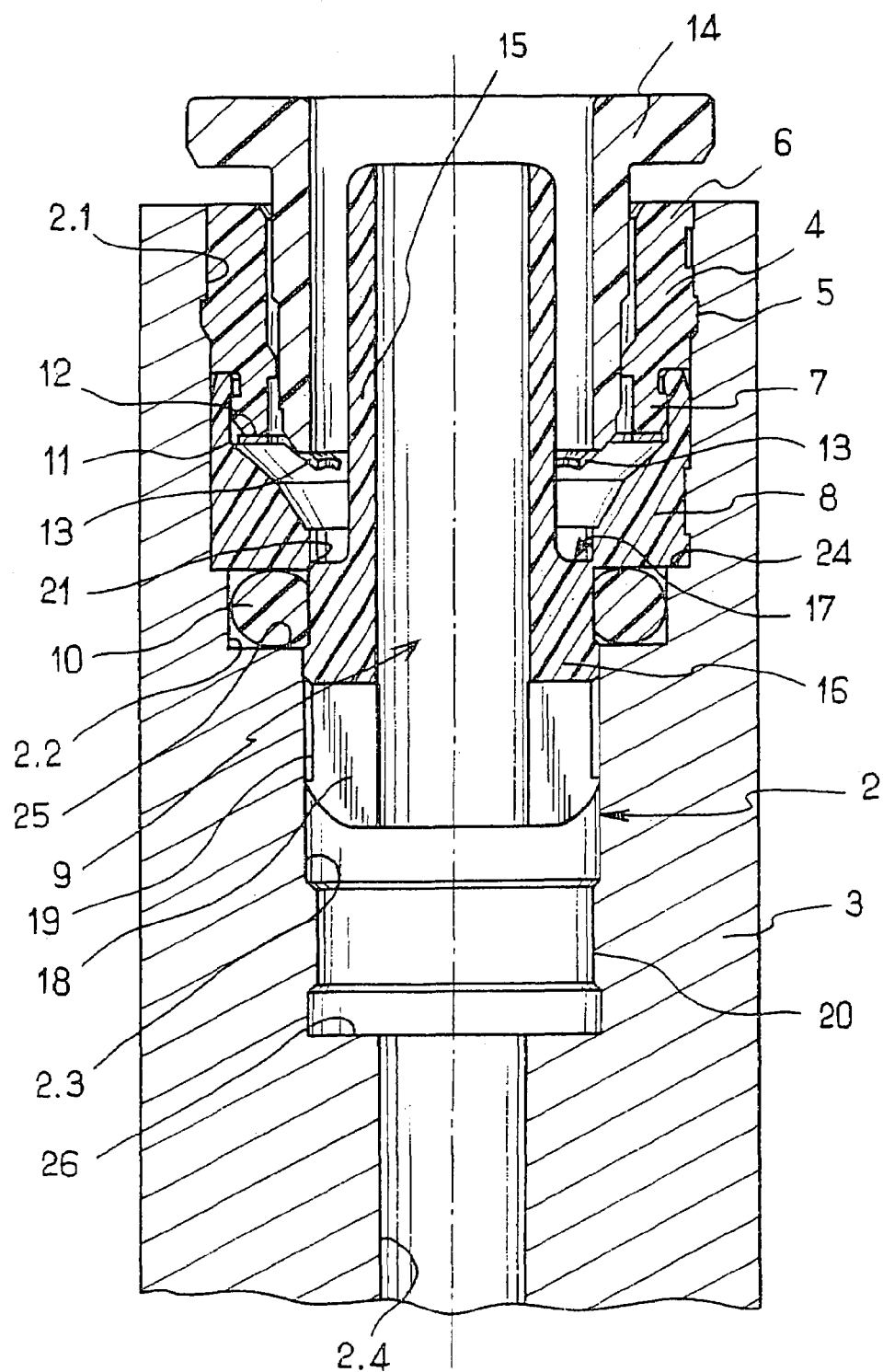
FIG_2

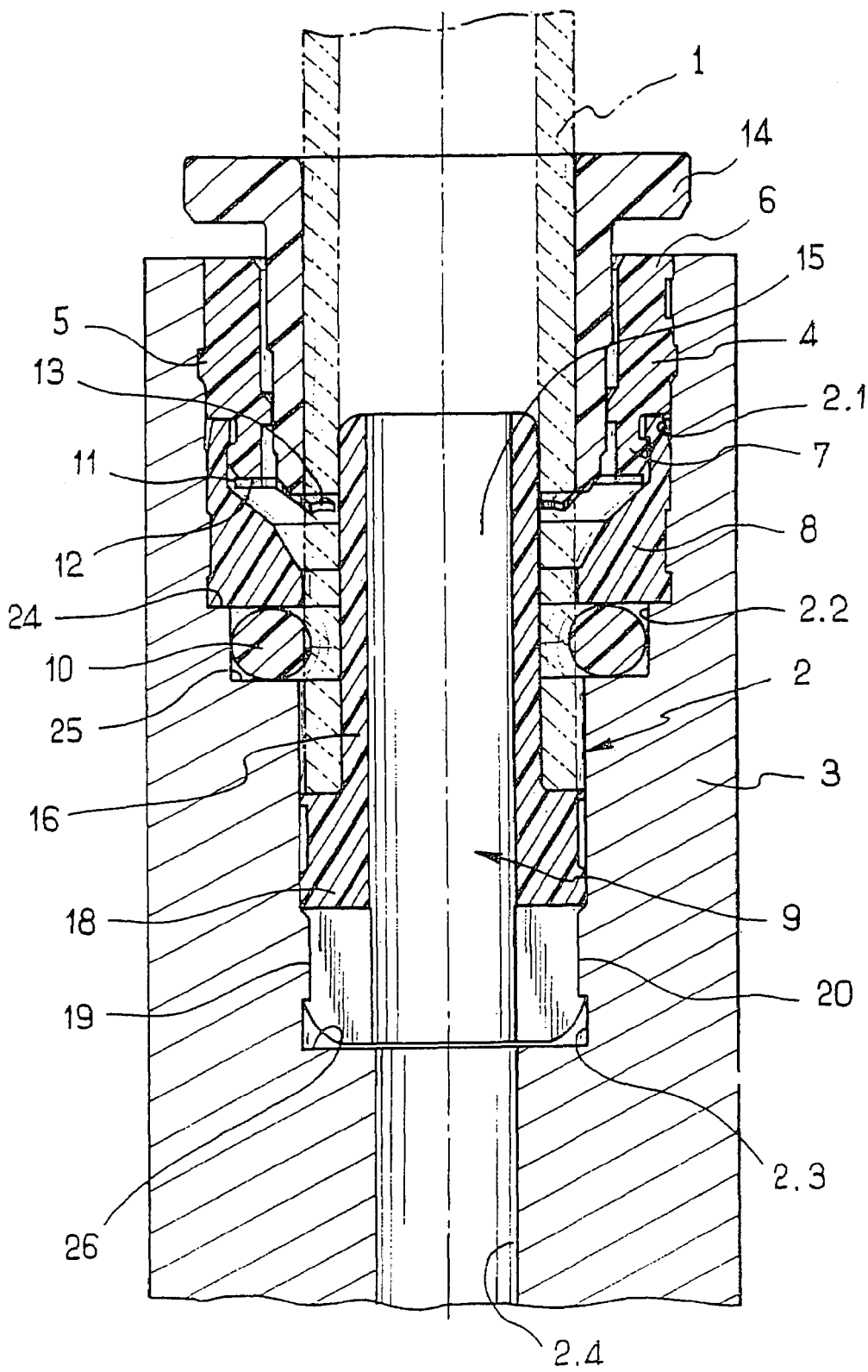
FIG_3

QUICK COUPLING DEVICE

CROSS REFERENCE TO RELATED APPLICATIONS

This is the 35 USC 371 National Stage of International Application PCT/FR02/03187 filed on 18 Sep. 2002, which designated the United States of America.

FIELD OF THE INVENTION

The present invention relates to a quick coupling device for coupling one end of a pipe to an element of a fluid transport circuit such as another pipe, a fluid emitter element such as a pump, or a fluid receiver element such as a tank. More particularly, the invention relates to a quick coupling device of the cartridge type for anchoring one end of a pipe in a bore of the body of the element, and also for sealing the resulting coupling.

BACKGROUND OF THE INVENTION

Quick coupling devices are known that comprise a tubular insert possessing means for anchoring it permanently in the rigid element, means for retaining the end of the pipe, and a sealing gasket. The anchoring means are generally implemented in the form of a spigot with serrated tangs formed on the outside surface of the tubular insert in order to oppose the insert being withdrawn axially once it has been inserted into a bore of the circuit element. The retaining means are generally implemented in the form of a washer having inwardly-directed teeth, in which the teeth (or claws) are lifted by bending during insertion of the end of the pipe into the tubular insert, and subsequently tend to bite into the pipe in order to opposite extraction thereof. The sealing gasket, generally an O-ring, is associated with the tubular insert in such a manner as to be compressed between the wall of the bore and the outside surface of the end of the pipe.

When the coupling is to be subjected to high levels of stress, for example when it is implanted in a circuit where a fluid flows at a relatively high pressure, the washer used is very stiff so as to be able to oppose large extraction forces. Nevertheless, there exists a risk of the end of the pipe flattening slightly so that not all of the teeth in the washer bite correctly into the outside surface at the pipe end. This phenomenon can result in particular from the pipe end being ovalized due to a bending force being exerted on the pipe from outside the coupling.

To obviate that drawback, proposals have been made to support the pipe end by means of a rigid bushing that is inserted therein.

Quick coupling inserts or cartridges provided with an internal bushing are known, in particular from documents U.S. Pat. No. 5,673,942 and DE 198 00 050.

The question which remains poorly solved by those known devices is the question of sealing the coupling, which generally requires either two sealing elements to be provided or else the element in the bore to be provided with a gasket independent of the cartridge, which goes against the concept of a cartridge coupling.

OBJECTS AND SUMMARY OF THE INVENTION

To mitigate that drawback, the present invention provides a quick coupling device comprising a tubular insert provided with external anchor means, a deformable claw washer which defines a through opening and which is received in the tubular insert, at least one sealing gasket, and a tubular bushing connected by connection means to the tubular insert to extend coaxially through the opening in the washer, in which the connection means are releasable by inserting a tubular member into the insert, which tubular member may be either a pipe end or else a punch or tool for assembly purposes.

The releasable nature of the connection enables the bushing to be given a temporary role, for example that of supporting a gasket, thus enabling the insert together with its anchor means and its pipe-retaining means, the bushing, and the gasket to be combined in the form of a cartridge that form a coherent subassembly suitable for automatic installation.

In which case, and advantageously, the tubular bushing possesses an external shoulder to form an abutment for driving the tubular bushing by means of a pipe end engaged in the coupling device (or by means of a suitable tool), and beyond the shoulder, the tubular bushing includes an end of outside diameter substantially equal to the outside diameter of the pipe end and which projects out from the tubular insert to form a support for the sealing gasket.

Since the releasable connection means are preferably a breakable connection zone that breaks under the force of inserting the pipe end into the tubular insert (or inserting a punch when mounting the coupling device in a rigid element), the breakable zone which is weaker than the bushing and the insert breaks and releases the bushing which is driven by the pipe end or by the tool. The sealing gasket is prevented from moving axially in the bore and is therefore not driven by the bushing, so that the pipe end can take its place at the end of the bushing that was carrying the gasket, and so that the sealing gasket performs a sealing function between the pipe end and the bore of the rigid element. The bushing thus performs two functions, one of supporting the pipe during coupling, and another of holding the insert and the sealing gasket together prior to coupling.

BRIEF DESCRIPTION OF THE DRAWINGS

Other characteristics and advantages of the invention will appear on reading the following description of a particular and non-limiting embodiment of the invention.

Reference is made to the accompanying drawings, in which:

FIG. 1 is a longitudinal section view of a coupling device in accordance with the invention;

FIG. 2 is a view analogous to FIG. 1 of the coupling device inserted in a bore of a circuit element, prior to coupling a pipe end; and FIG. 3 is a view analogous to FIG. 2 after a pipe end has been coupled in the coupling device.

DETAILED DESCRIPTION OF THE INVENTION

With reference to the figures, the coupling device described herein is for enabling a connection to be established between one end of a pipe shown in chain-dotted lines in FIG. 3 under the reference 1, and a bore given overall reference 2 in an element 3 of a fluid transport circuit, such as another pipe, a fluid receiver element such as a tank, or a fluid emitter element such as a pump.

The quick coupling device comprises a tubular insert 4 designed to be implanted in the bore 2 of the element 3 in order to receive therein the pipe end 1. The tubular insert 4 is provided on the outside with means for anchoring it in the bore 2. In this case, the anchor means comprise an annular portion in relief 5 constituting a serrated tang formed on the outside surface of the tubular insert 4 to oppose axial withdrawal of the tubular insert 4 once it has been inserted into the inside of a first section of the bore 2 in the element 3.

The tubular insert 4 possesses a first end 6 into which the pipe end is to be inserted, and a second end 7 which is associated with a ring 8 providing a connection with a tubular bushing 9, and with a sealing gasket 10 that is to seal the coupling.

The end 7 of the tubular insert 4 is inserted and held by force inside the ring 8 using a known clip-fastening technique. The end 7 of the tubular insert 4 and the ring 8 co-operate to define a groove 11 which constitutes a housing for a washer 12 provided on the inside with teeth 13 (or claws) for catching and retaining the end of the pipe 1 which is to be inserted into the coupling device. Means for anchoring the ring 8 in the bore 2 may be provided on the outside surface of the ring 8.

A tubular pusher 14 is mounted in conventional manner in the tubular insert 4 to slide between a pushed-in position in which the nose of the tubular pusher 14 lifts the teeth 13 of the washer 12, and a retracted position in which the nose of the tubular pusher 14 is spaced apart from the teeth 13 of the washer 12. The inside diameter of the tubular pusher 14 is substantially equal to the outside diameter of the pipe end 1.

The tubular bushing 9 comprises a first segment 15 having an outside diameter substantially equal to the inside diameter of the pipe end 1 so as to be capable of being inserted therein, and a second segment 16 of outside diameter substantially equal to the outside diameter of the pipe end 1 and which is connected to the first segment 15 via a shoulder 17 forming an abutment to engagement of the tubular bushing 9 into the pipe end 1. The second segment 16 possesses a free end 18 provided with means enabling it to be snap-fastened in the bore 2 of the element 3. In this case, these means comprise an outer groove 19 for co-operating with an annular step 20 formed in corresponding manner in the bore 2. The free end 18 of the second segment 16 is split axially so as to facilitate radial deformation thereof and insertion into the portion of the bore 2 that is narrowed by the annular step 20. The free end 18 of the second segment 16 is also chamfered so as to facilitate insertion into the bore 2. The snap-fastening means may be replaced by other, analogous means such as cramp means.

In this embodiment, the tubular bushing 9 and the ring 8 are made as a single piece of thermoplastic material of greater rigidity than the pipe end 1 and they are connected to each other at the shoulder 17 via a breakable zone 21. The term "breakable zone" is used to mean a zone that is weaker than the ring 8 and the tubular bushing 9 so that it can break under the force of inserting the pipe end 1 into the coupling device, thereby axially releasing the tubular bushing 9. The ring 8 positions the tubular bushing 9 in such a manner that the tubular bushing 9 extends coaxially inside the washer 12 and the first segment 15 of the tubular bushing 9 extends through the opening in the washer 12 while the second segment 16 projects out from the tubular insert 4 and the ring 8.

The sealing gasket 10 is mounted on the second segment 16 of the tubular bushing 9 so as to be adjacent to the ring 8.

A protective cap 22 is removably mounted on the free end 18 of the second segment 16 to cover the sealing gasket 10 and protect it. In this embodiment, the cap 22 includes an inwardly-directed annular portion in relief 23 for co-operating with the groove 19.

Prior to mounting the quick coupling device in the element 3, the element 3 must have a suitable bore. The bore 2 is subdivided axially into four sections, a large diameter section 2.1 which opens to the outside and is for receiving the tubular insert 4 and the ring 8, a smaller diameter section 2.2 for receiving the gasket 10, a section 2.3 possessing a diameter substantially equal to the outside diameter of the pipe end and of the second segment 16 of the tubular bushing 9, and which is provided with the annular step 20, and a section 2.4 of diameter substantially equal to the inside diameter of the tubular bushing 9. Radially-extending bearing faces 24, 25, and 26 extend respectively between the sections 4.1 & 4.2, 4.2 & 4.3, and 4.3 & 4.4.

After removing the cap 22, the coupling device is inserted into the bore 2 via the free end 18 of the second segment 16 of the inner bushing 9. The coupling device is properly mounted once the ring 8 comes into abutment against the radially-extending bearing face 24, the sealing gasket 10 then being received in the section 2.2 of the bore 2, while the free end 18 of the second segment 16 of the tubular bushing 9 is then received in the section 2.3 of the bore 2 (see FIG. 2).

The tubular bushing 9 is then put fully into place by means of a punch (not shown in the figures) that is inserted into the coupling device. When the punch comes into abutment against the tubular bushing 9 and while insertion of the punch continues, the breakable zone 21 breaks under the force exerted by the punch against the shoulder 17. The tubular bushing 9 is then released axially and entrained together with the punch until the free end 18 of the second segment 16 comes into abutment against the shoulder 26. The free end 18 of the second segment 16 of the tubular bushing 9 is then snap-fastened in the section 2.3 of the bore 2 (the annular step 20 is received in the groove 19). The sealing gasket 10 is retained by the shoulder 25 while the bushing is being entrained by the punch (see FIG. 3).

The pipe end 1 is coupled by inserting the pipe end 1 into the tubular pusher 14 in such a manner that the pipe end 1 is engaged on the first segment 16 of the tubular bushing 9.

While the pipe end 1 is being engaged on the first segment 15, the pipe end 1 passes into the through opening of the washer 12 causing the washer to become deformed and raising its teeth 13 which come to press against the outside surface of the pipe end 1.

The tubular bushing 9 becomes pushed fully home into the pipe end 1 once the end face of the pipe end 1 comes into abutment against the shoulder 17.

At this stage, the pipe end 1 is coupled and has been engaged in the sealing gasket 10 which is then compressed between the outside surface of the pipe end 1 and the wall defining the section 2.2 of the bore 2.

In the coupled position, the first segment 15 of the tubular bushing 9 supports the pipe end 1 in register with the sealing gasket 10 and above all in register with the washer 12. This serves to limit radial deformation of the pipe end 1. This improves the strength of the retention exerted by the teeth 13 of the washer 12 and reinforces their ability to penetrate into the pipe end 1 and also reinforces the quality of the sealing provided by the sealing gasket 10.

In order to separate the pipe end 1 from the coupling device, the pusher 14 is pushed in so as to lift the teeth 13, and the pipe end is then extracted from the coupling device.

The tubular bushing 9 remains in position inside the bore 2 given that it is snap-fastened in the third section 2.3 of the bore.

Naturally, the invention is not limited to the embodiment described and various embodiments can be devised without going beyond the ambit of the invention as defined by the claims.

In particular, other types of means for connecting the tubular bushing 9 to the tubular insert 4 can be used, such as snap-fastening or clip-fastening means, partial heat-sealing or bonding with adhesive, all of which means can be released, in particular under the effect of a force tending to separate the bushing axially from the insert.

In addition, provision can be made for the tubular bushing 9 to be put finally into place when inserting the pipe end.

The invention claimed is:

1. A quick coupling device comprising a tubular insert (4) provided with external anchor means (5), a deformable claw washer (12) which defines a through opening and which is received in the tubular insert, at least one sealing gasket (10), and a tubular bushing (9) connected by connection means (8, 21) to the tubular insert (4) to extend coaxially through the opening in the washer, wherein the connection means are releasable by inserting a tubular member into the insert.

2. A quick coupling device according to claim 1, wherein the tubular bushing (9) has an end (16) of outside diameter substantially equal to the outside diameter of the pipe end and which projects out from the tubular insert (4) to form a support for the sealing gasket (10).

3. A coupling device according to claim 2, wherein the end (16) of the tubular bushing (9) co-operates with the tubular bushing (9) to define an outwardly-directed shoulder (17) to form means enabling the tubular bushing to be driven relative to the tubular insert (4).

4. A quick coupling device according to claim 2, including a protective cap (22) removably mounted on the coupling device to cover the sealing gasket (10).

5. A coupling device according to claim 1, wherein the connection means (21) are of the breakable type.

6. A coupling device according to claim 5, wherein the connection means comprise a ring (8) snap-fastened on one end (7) of the tubular insert (4) and connected to the tubular bushing (9) via a breakable zone (21).

7. A quick coupling device according to claim 1, wherein the tubular bushing (9) is provided on the outside with means (19) for anchoring the tubular bushing in a bore of a circuit element that is to receive the coupling device.

8. A quick coupling device according to claim 1, wherein the tubular bushing (9) is connected to the tubular insert (4) downstream from the washer (12) relative to the direction in which a pipe end is inserted into the coupling device.

* * * * *